United States Patent
Stark et al.

(10) Patent No.: US 10,948,344 B2
(45) Date of Patent: Mar. 16, 2021

(54) OPTICAL FIBER SPECTROSCOPY USING SINGLE PHOTON DETECTORS (SPDS)

(71) Applicant: HALLIBURTON ENERGY SERVICES, INC., Houston, TX (US)

(72) Inventors: Daniel J. Stark, Houston, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/310,479

(22) PCT Filed: Aug. 26, 2016

(86) PCT No.: PCT/US2016/048922
§ 371 (c)(1),
(2) Date: Dec. 17, 2018

(87) PCT Pub. No.: WO2018/038734
PCT Pub. Date: Jan. 3, 2018

(65) Prior Publication Data
US 2019/0339124 A1    Nov. 7, 2019

(51) Int. Cl.
*G01J 3/02* (2006.01)
*G01J 3/28* (2006.01)
*G01N 21/21* (2006.01)
*G01N 21/31* (2006.01)
*G01J 1/44* (2006.01)

(52) U.S. Cl.
CPC ........... *G01J 3/0218* (2013.01); *G01J 3/2803* (2013.01); *G01N 21/21* (2013.01); *G01N 21/31* (2013.01); *G01J 2001/442* (2013.01); *G01N 2201/021* (2013.01); *G01N 2201/084* (2013.01)

(58) Field of Classification Search
CPC .. G01J 3/0218; G01J 3/2803; G01J 2001/442; G01N 21/31; G01N 21/21; G01N 2201/084; G01N 2201/021
See application file for complete search history.

(56) References Cited

U.S. PATENT DOCUMENTS

| | | | |
|---|---|---|---|
| 7,049,593 B2 | 5/2006 | Sobolewski et al. | |
| 7,196,786 B2 | 3/2007 | Difoggio | |
| 7,366,365 B2 * | 4/2008 | Carver | A61B 5/0068 356/326 |
| 7,423,258 B2 | 9/2008 | Difoggio et al. | |
| 7,548,053 B2 * | 6/2009 | Morf | G01J 3/2803 324/96 |
| 7,844,188 B2 | 11/2010 | Takemoto | |

(Continued)

OTHER PUBLICATIONS

International Search Report and Written Opinion dated Jan. 20, 2017 for international patent application No. PCT/US2016/048922, filed on Aug. 26, 2016.

(Continued)

*Primary Examiner* — Mohamed K Amara
(74) *Attorney, Agent, or Firm* — Chamberlain Hrdlicka

(57) ABSTRACT

An optical detection system for analyzing a fluid sample including a light source configured to emit a light beam to interact with the sample to form a spectrum, an optical fiber to transmit the spectrum, an array of single-photon detectors (SPDs), and wherein each SPD is configured to receive and is tunable to analyze spectral characteristics of the spectrum across a spectral range.

20 Claims, 5 Drawing Sheets

(56) References Cited

U.S. PATENT DOCUMENTS

| | | | |
|---|---|---|---|
| 7,969,571 B2 | 6/2011 | Difoggio | |
| 8,345,234 B2 | 1/2013 | Myrick et al. | |
| 8,358,418 B2 | 1/2013 | Myrick et al. | |
| 8,417,748 B2 | 4/2013 | Chang | |
| 8,669,512 B2* | 3/2014 | Nevet | G01J 1/42 250/214.1 |
| 8,670,620 B2 | 3/2014 | Robles-Kelly et al. | |
| 8,736,835 B2* | 5/2014 | Djeu | G01J 3/021 356/301 |
| 9,029,762 B2 | 5/2015 | Shen et al. | |
| 10,101,203 B2* | 10/2018 | Birk | G01J 1/18 |
| 10,677,652 B2* | 6/2020 | Lemieux | G01J 3/0224 |
| 2003/0094281 A1* | 5/2003 | Tubel | E21B 47/00 166/250.03 |
| 2012/0156714 A1* | 6/2012 | O'Brien | G01J 3/36 435/29 |
| 2013/0015331 A1* | 1/2013 | Birk | G01J 3/36 250/208.2 |
| 2013/0342835 A1* | 12/2013 | Blacksberg | G01J 3/2889 356/301 |
| 2014/0071446 A1* | 3/2014 | Djeu | G01J 3/36 356/301 |
| 2014/0153926 A1 | 6/2014 | Mower et al. | |
| 2014/0186966 A1* | 7/2014 | Tsupryk | G01N 21/645 436/94 |
| 2014/0299751 A1* | 10/2014 | Tang | G01J 1/0425 250/227.11 |
| 2014/0353476 A1* | 12/2014 | Bachar | G01J 1/42 250/227.24 |
| 2015/0247950 A1 | 9/2015 | Perkins | |
| 2016/0041032 A1* | 2/2016 | Matthews | G01J 3/0205 356/402 |
| 2016/0349167 A1* | 12/2016 | Eising | G01J 3/44 |
| 2017/0234797 A1* | 8/2017 | Kostamovaara | G01N 21/65 356/301 |
| 2018/0259393 A1* | 9/2018 | Pylkkanen | G01J 3/0208 |
| 2018/0364207 A1* | 12/2018 | Roberts | G01N 31/225 |
| 2019/0195688 A1* | 6/2019 | Atabaki | G01J 3/0229 |
| 2020/0072669 A1* | 3/2020 | Rountree | G01J 3/0218 |

OTHER PUBLICATIONS

Antonio Plaza et al, Spatial/Spectral Endmember Extraction by Multidimensional Morphological Operations, Spatial/Spectral Endmember Extraction by Multidimensional Morphological Operations, Sep. 2002, 2025-2041, vol. 40, No. 9.

F. Marsili et al, Detecting single infrared photons with 93% system, Detecting single infrared photons with 93% system, Feb. 2013, 210-214, vol. 7, No. 3.

Miassimo Spina et al, Microengineered CH3NH3PbI3 Nanowire/Graphene Phototransistor for Low-Intensity Light Detection at Room Temperature, Microengineered CH3NH3PbI3 Nanowire/Graphene Phototransistor for Low-Intensit Light Detection at Room Temperature, 2015, 4824-4828, 2015.

Miguel A. Veganzones et al, Endmember Extraction Methods: A Short Review, Endmember Extraction Methods: A Short Review, 2008, 400-407, vol. 5179.

Taro Yamashita et al, Fluorescence correlation spectroscopy with visible-wavelength superconducting nanowire single-photon detector, Fluorescence correlation spectroscopy with visible-wavelength superconducting nanowire single-photon detector, 2014, 28783-28789, 2014.

V. B. Verma et al, A four-pixel single-photon pulse-position array fabricated from WSi superconducting nanowire single-photon detector, A four-pixel single-photon pulse-position an-ay fabricated from WSi superconducting nanowire single-photon detector, 2014, 5, vol. 104.

* cited by examiner

OPTICAL FIBER SPECTROSCOPY USING SINGLE PHOTON DETECTORS (SPDS)

This section is intended to provide relevant contextual information to facilitate a better understanding of the various aspects of the described embodiments. Accordingly, it should be understood that these statements are to be read in this light and not as admissions of prior art.

In spectroscopic analysis, signals can be transmitted through a fiber optic material or other types of conduits that experience power loss and reduced signal integrity. The signals are received by an optical detector(s) that analyzes the spectral characteristics of the signals as a function of wavelength, frequency, power, and the like. For example, with a wavelength range of about 800 nanometers (nm) (0.8 micron (μm)) to about 1,550 nm (1.55 μm), the signals can propagate through the fiber optic material and into the optical detector with optimal signal integrity including low attenuation and high transmission speeds. However, signals transmitted via the fiber optic material outside of the 800 nm-1,550 nm wavelength range, e.g., shorter than 700 nm (0.7 μm) and 1600 nm (1.60 μm) and longer, often experience decreased signal integrity including low signal-to-noise ratios and power loss, among other factors. In this regard, the optical detector cannot detect or does not receive the signals due to poor transmission and signal deterioration during transmission. If weak signals are received by the optical detectors, the analysis often provides inaccurate results, including failed or inaccurate detection of downhole fluids and their characteristics.

BRIEF DESCRIPTION OF THE DRAWINGS

For a detailed description of the embodiments of the invention, reference will now be made to the accompanying drawings in which.

DETAILED DESCRIPTION

Figure 1A:
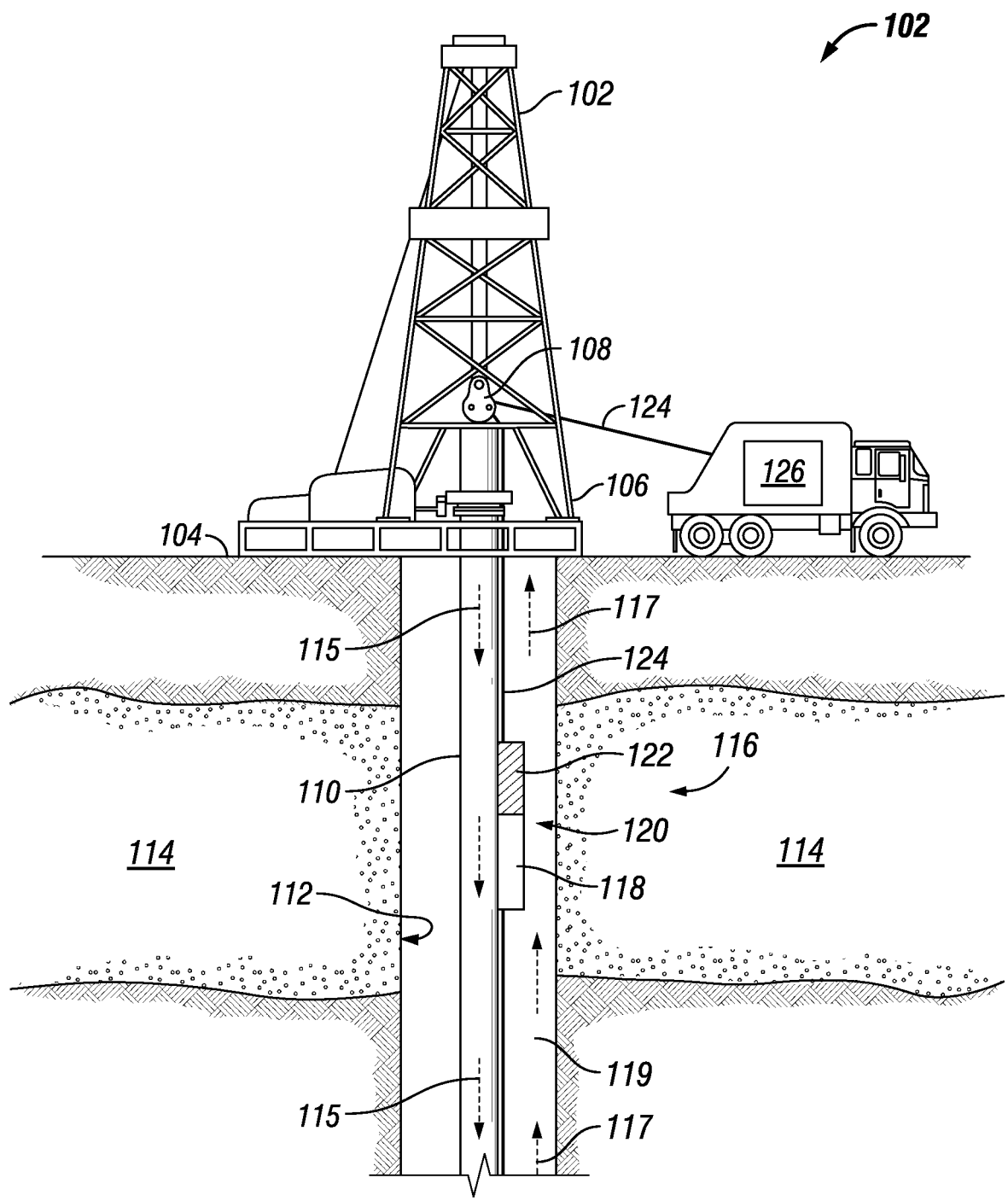
FIG. 1 is a perspective view of an example optical detection system and an array of single-photon detectors (SPDs) used in a hydrocarbon environment, according to one or more embodiments.
Figure 1B:
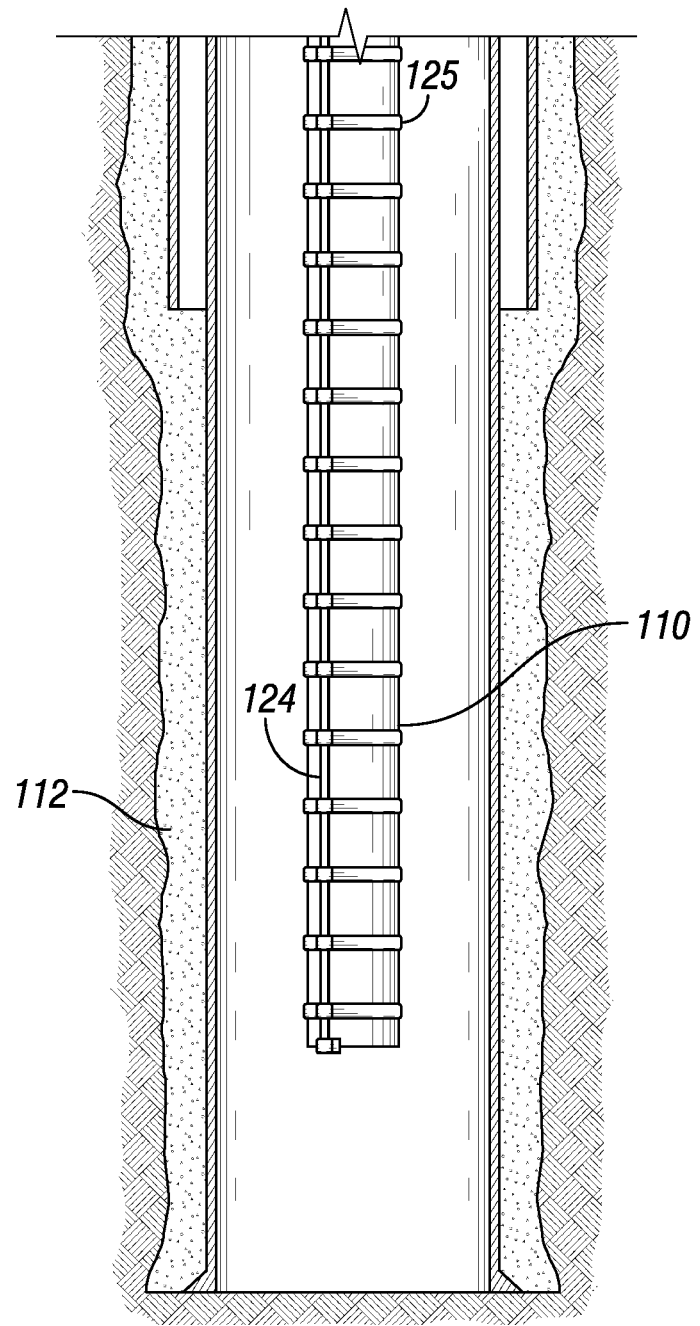
Figure 1C:
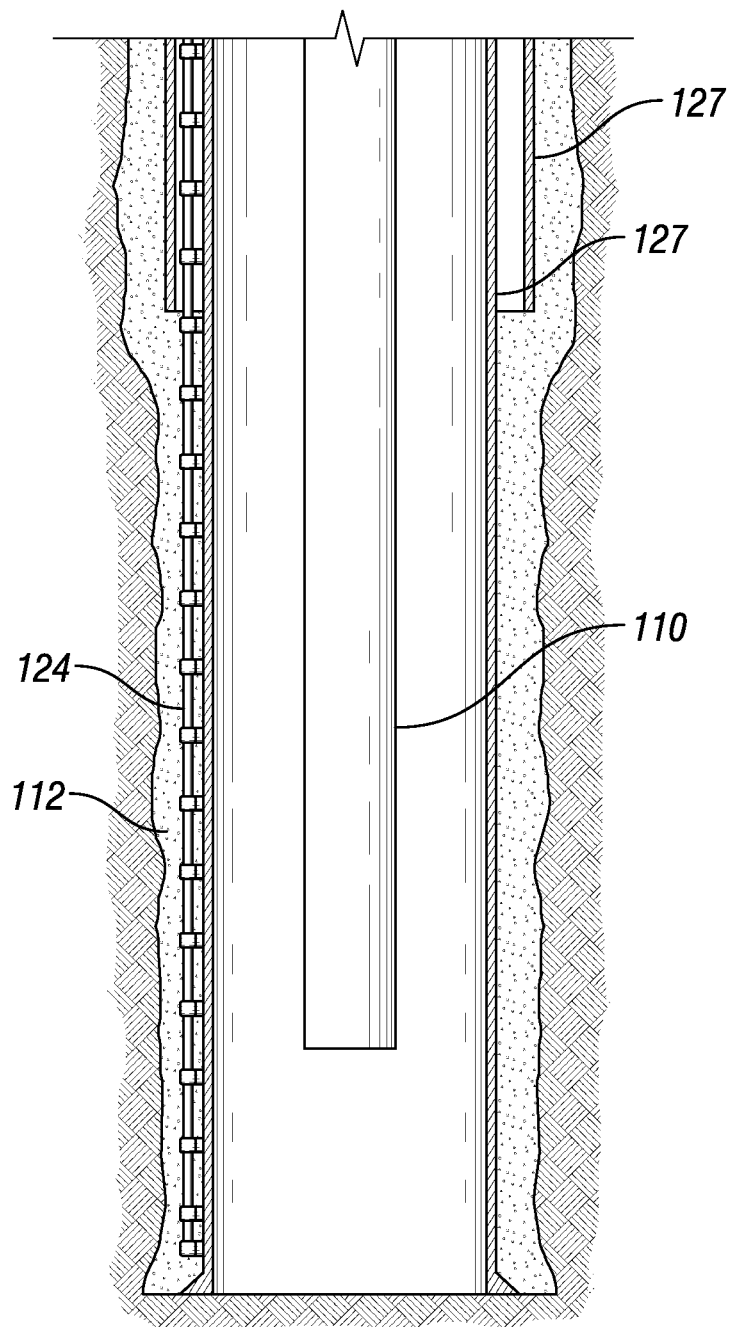

FIG. 1 is a perspective view of an example optical detection system 116 and an array of single-photon detectors (SPDs) 126 used in a hydrocarbon environment 100, according to one or more embodiments. Various operations are carried out in the hydrocarbon environment 100 including drilling, production, logging, and long-term monitoring, among others. A rig 102 atop a surface 104 is equipped with a derrick 106 that supports a hoist 108 to raise or lower a work string 110 into a wellbore 112. The wellbore 112 is formed within a subterranean formation 114 to carry out exploration and extraction of hydrocarbons from the formation 114. In addition to hydrocarbons, the wellbore 112 may include water, gases, and chemical fluids, among other downhole fluids. The wellbore 112 of FIG. 1 is shown as near-vertical, but can be formed at any suitable angle to reach a hydrocarbon-rich portion of the subterranean formation 114. In embodiments, the wellbore 112 can follow a vertical, partially-vertical, angled, or even a partially-horizontal path through the subterranean formation 114.

The work string 110 is integrated with multiple known devices/tools, including measuring devices and tools to retrieve, analyze, and/or generate wellbore-related information. In the embodiments, the work string 110 includes the optical detection system 116 configured to capture and analyze information related to characteristics of the subterranean formation 114 and/or wellbore 112. In particular, the optical detection system 116 can provide information related to the physical and chemical characteristics of fluids, such as formation fluids, and other fluids and materials of the subterranean formation 114 and the wellbore 112.

The optical detection system 116 includes several components including a light source 118 for providing a light beam and a fluid chamber 120 that receives a portion, i.e., a sample 122, of the fluids and/or materials from the subterranean formation 114 and/or the wellbore 112. The light source 118 can include a diode laser, a fiber laser, an incandescent light bulb, and so forth. The fluid chamber 120 can use various types of flow sample technologies for fluid sampling or capturing and releasing the sample 122, such as Integrated Computational Element (ICE) Core technology. The sample can include one or more components, such as oil, water, and various gases. The light beam is directed so as to pass through the sample 122 and is spectrally attenuated by the sample 122 so that a spectrum for each of the components is created. The spectra are transmitted to the optical detection system 116 for analysis in the form of a signal(s).

The optical detection system 116 also includes a fiber optic cable 124 that extends externally or internally along the length of the work string 110. The fiber optic cable 124 is used as a conduit to transmit the signal(s) to the array of single-photon detectors (SPDs) 126. The fiber optic cable 124 can be made of silica (amorphous silicon dioxide) or similar materials. The fiber optic cable 124 can include a single mode transmission cable or a multi-mode transmission cable with a covering or jacket to protect against external influences. In other examples, the work string 110 may be removed from the wellbore 112 and the fiber optic cable 124 can extend into the wellbore 112 using wireline or logging cable, for example.

The signal transmitted via the fiber optic cable 124 includes data related to the spectrum for each component in the sample 122, including the characteristics and properties for each component. The array of SPDs 126 detects and analyzes the signal, as a function of one of a wavelength, power intensity, frequency, polarization, or other parameters. For clarity purposes, the spectral characteristics of the signal will be described in terms of wavelengths in the embodiments. The array of SPDs 126 analyzes the various wavelengths to determine the chemical composition and other characteristics and properties of the sample 122. The wavelengths may range from about 100 nm (0.1 μm) to about 10,000 nm (10 μm) on an electromagnetic (EM) spectrum.

The strength of a signal at a wavelength range of about 800 nanometers (nm) (0.8 μm) to about 1,550 nm (1.55 μm) is often transmitted via the fiber optic cable 124, or other conduit types, with optimal signal integrity and transmission speeds so as to be fully transmittable and readable. However, with wavelengths outside of the 800 nm-1,550 nm wavelength range, e.g., 0.01 nm-700 nm and 1600 nm and beyond, a signal transmitted through the fiber optic cable 124 to the array of SPDs 126 can deteriorate and experience increased power loss during transmission. Such weak signals contain a low photon count, e.g., a few photons or a single photon, that is often undetectable to optical detectors.

However, due to its level of sensitivity, the array of the SPDs 126 is capable of sensing and counting few photons or a single photon, as will be further described. The array of SPDs 126 has the ability to remotely detect both high and low attenuated signals transmitted via fiber optic cables. In the embodiments, each SPD of the array 126 is tuned to a wavelength or wavelength range to detect signals of varied strengths that are transmitted via the fiber optical cable 124. In particular, the array of SPDs 126 detects signals at any wavelength within a range from about 100 nm (0.1 µm) to about 10,000 nm (10 µm). Accordingly, the array of SPDs 126, without the use of additional detectors or other equipment, is able to detect and analyze the various wavelengths of the different components in the sample 122, even a wavelength or wavelength range associated with a single or few photons. In addition to wavelength, the array of SPDs 126 can also be tuned to determine power intensity, polarization, frequency, or other parameters, of the signal.

As shown in FIG. 1, the array of SPDs 126 is located above ground, however, the SPDs 126 could be located in a downhole environment while subjected to cooling techniques to maintain a temperature range below −63.15 Celsius (C°) (−81.67 Fahrenheit (F)). It should be understood that the optical detection system 116 is illustrative and that additional components may be present that have not necessarily been illustrated in the interest of clarity. In particular, the number of light sources 118, fiber optic cables 124, array of SPDs 126, among other components, are not limited by the embodiment of FIG. 1. Other components that may be present in the embodiments include, but are not limited to, sensors, pressure controllers, pressure sensors, flow rate controllers, flow rate sensors, temperature sensors, and the like.

Figure 2:
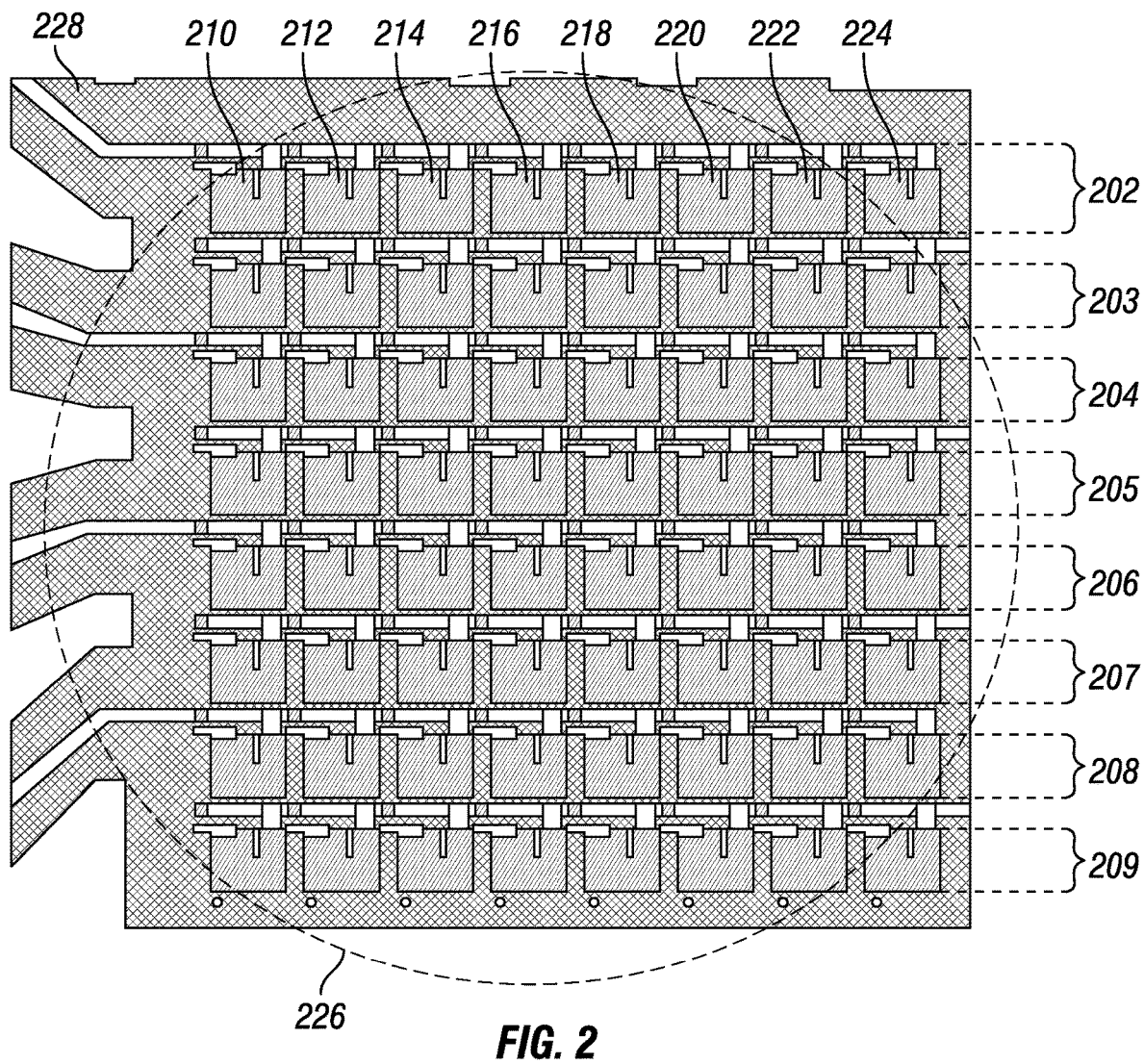
FIG. 2 is a perspective view of an example array of single-photon detectors (SPDs), according to one or more embodiments.

FIG. 2 is a perspective view of an example array of single-photon detectors (SPDs) 226, according to one or more embodiments. Each SPD of the array 226 is composed of nanofabricated nanowires, nanotubes, or other nanostructures that can be patterned on one or more substrates 228, such as a magnesium oxide or sapphire substrates. The substrate 228 can include pseudo-cavities with spacing less than half a wavelength underneath the patterned nanostructures. The nano-structures are intertwined and patterned to encompass a large surface area to improve sensitivity when analyzing light across a wavelength range, for example, from about 100 nm (0.1 µm) to about 10,000 nm (10 µm). Each SPD of the array of SPDs 226 can cover a portion of the total wavelength range, such as about 0.001 nm to about 100 nm (0.1 µm) of the total wavelength range to provide a narrow wavelength range or about 500 nm (0.5 µm) of the total wavelength range to provide a broad wavelength range.

The entire range of the possible wavelengths for light can be plotted on an EM spectrum divided into various spectrum regions. The regions including, but not limited to, radio waves, microwaves, IR waves, visible spectrum, ultra-violet (UV) rays, X-rays, and gamma rays. Thus, each component in a sample is associated with a particular region of the EM spectrum. For example, a component with an intensity in the visible region is detected in about a 400 nm (0.4 µm)-700 nm (0.7 µm) wavelength range, whereas another component with an intensity in the UV region is detected at about a 200 nm (0.2 µm)-400 nm (0.4 µm) wavelength range.

Signal deterioration and increased power loss often occurs when a signal is transmitted via a fiber optic material or other conduits at particular wavelength ranges (i.e., spectrum regions). In the embodiments, each SPD of the array 226 is tuned to a specific wavelength(s) or a wavelength range(s) to detect wavelengths ranging anywhere from about 100 nm (0.1 µm) to about 10,000 nm (10 µm). The SPD can be tuned acoustically, mechanically, or thermally using grating, prisms, filters, and the like. The wavelengths are analyzed by the array of SPDs 226 to provide chemical and physical data about the varied components in the sample. It should be understood that the array of SPDs 226 can be tuned based on parameters other than wavelength including power intensity, frequency, spectral width of the wavelength, a peak of the wavelength, and the like.

As an example, the array of SPDs 226 of FIG. 2 can be tuned to broad wavelength ranges to detect signals in a wavelength range of about 400 nm to about 1100 nm. The SPDs in a first row 202 can be tuned to detect wavelengths ranging from 400 nm to 499 nm. Likewise, subsequent rows of SPDs 203-209 can be tuned to analyze across other wavelength ranges. The SPDs in row 203 tuned from 500 nm to 599 nm, the SPDs in row 204 tuned from 600 nm to 699 nm, and the SPDs in row 205 tuned from 700 nm to 799 nm. Although a fiber optic cable transmits the signal with a high signal integrity loss in the 400 nm-700 nm wavelength range, the array of SPDs 226 is capable of detecting and analyzing the spectral characteristics of such wavelengths.

Using the same array of SPDs 226, signals in the 800 nm-1100 nm wavelength range are also detected and analyzed. For example, the SPDs in row 206 may be tuned from 800 nm to 899 nm, the SPDs in row 207 tuned from 900 nm to 999 nm, the SPDs in row 208 tuned from 1000 nm to 1099 nm, and the SPDs in row 209 tuned from 1100 nm to 1199 nm. Accordingly, the array of SPDs 226 detects both low and high attenuated signals with a wavelength range of about 400 nm to about 1100 nm.

In another embodiment, instead of tuning the array of SPDs 226 to broad wavelength ranges, the SPDs are tuned to narrow wavelength ranges to detect varied signal strengths propagated over fiber optic cables. For instance, the SPDs in the row 202 may be tuned to detect wavelengths ranging from 400 nm to 499 nm. Accordingly, the SPDs in row 202 are tuned as follows: the SPD 210 tuned to a 400 nm-410 nm wavelength range, the SPD 212 tuned to a 410 nm-430 nm wavelength range, the SPD 214 tuned to a 430 nm-440 nm wavelength range, the SPD 216 tuned to a 440 nm-460 nm wavelength range, the SPD 218 tuned to a 460 nm-470 nm wavelength range, the SPD 220 tuned to a 470 nm-480 nm wavelength range, the SPD 222 tuned to a 480 nm-490 nm wavelength range, and the SPD 224 tuned to a 490 nm-499 nm wavelength range. Likewise, the SPDs in rows 203-209 can be tuned to narrow wavelength ranges or could be tuned to broad wavelength ranges, as previously discussed.

The broad and narrow wavelength ranges are useful when the components of the sample are unknown or uncertain. However, in some cases, the components of a fluid or material to be analyzed by the array of SPDs 226 are known. Instead of broadly or narrowly tuning the SPDs, portions of the array of SPDs 226 can be tuned to a specific wavelength(s) associated with the known components. For example, a sample includes a first known component with a wavelength range between 380 nm and 410 nm and a second known component with a wavelength range between about 1070 nm to about 1100 nm. To detect the first known component, a portion of the array of SPDs 226, e.g., rows 202-205, are tuned to a wavelength range of about 380 nm to about 410 nm. Additionally, another portion of the array of SPDs 226, e.g., rows 206-209, are tuned to a wavelength range of about 1070 nm to about 1100 nm to detect the second known component.

In another example, the array of SPDs 226 is used to detect and analyze a single known component with a wavelength range of about 380 nm to about 410 nm. A portion of the array of SPDs 226, e.g., rows 202-205, could be tuned to about 380 nm and another portion of the array of SPDs 226, e.g., rows 206-209, could be tuned to about 410 nm. Further, each SPD of the array of SPDs 226 could be tuned to a wavelength range of about 380 nm to about 410 nm. Accordingly, the array of SPDs 226, without additional optical detectors or other equipment, is able to analyze the signals regardless of signal integrity and the wavelength ranges.

It should be understood that the wavelength ranges provided for FIG. 2 are merely examples of wavelength ranges. Thus, other alterations and modifications of the wavelength range can occur based on the desired results. Further, the number of SPDs of the array 226 can be increased or decreased depending on the desired results.

Figure 3:
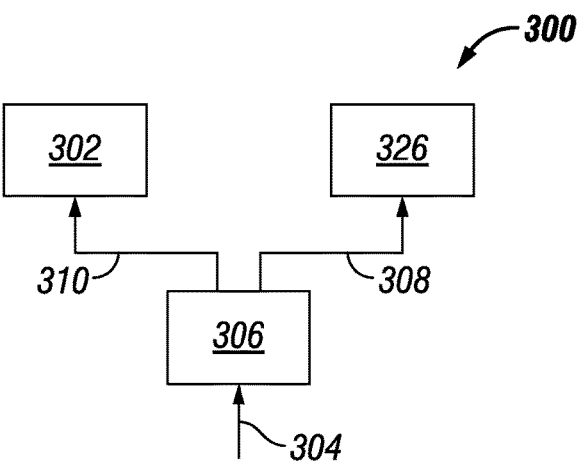
FIG. 3 is a block diagram of an example optical detection system including an array of SPDs and a detector device, according to one or more embodiments.

FIG. 3 is a block diagram of an example optical detection system 300 including an array of SPDs 326 and other types of detectors 302 that do not include SPDs, according to one or more embodiments. The other detectors 302 include, for example, a photodiode, a photomultiplier tube, or a perovskite phototransistor, among others. Both the SPDs 326 and the other detectors 302 convert photons, i.e., light, into electrical signals (e.g., current, voltage). However, the other detectors 302, as opposed to the SPDs 326, do not include superconducting nanowires to detect a single or a few photons. The SPDs 326 analyze spectral characteristics of a spectrum by detecting the change in resistance using the nanowires, which are usually in a cooled state. The resistance of the nanowires of the SPDs 326 is greatly increased when a photon hits the nanowires. The current that passes through the nanowires goes through a resistor, such as a shunt resistor, of the SPDs 326 to detect photons and yield a measurable electrical signal(s). Conversely, the other detectors 302 use a photoelectric effect to detect photons.

When the photon count is low, e.g., about 1 photon to about 10,000 photons, the other detectors 302 cannot detect such low photon counts and thus, fail to provide substantial quantum efficiency, i.e., a measure of the efficiency for a detector to convert photons into electrical signals. In this regard, the other detectors 302 provide a quantum efficiency ranging from about 0.01% to about 60% and each SPD 326 provides a quantum efficiency ranging from about 90% to about 100% when counting photons in a single or a few photon environment. Both the array of SPDs 326 and the other detectors 302 can be located above ground or in a downhole environment.

A routing component 306, such as a switching component or a splitting component, can direct, split, or reroute the signal 304. The routing component 306 routes a portion of the signal 308 to the array of SPDs 326 and another portion of the signal 310 to the detector devices 302. The signal 304 is routed to the SPDs 326 and the detectors devices 302 based on various signal properties including wavelength, power intensity, polarization, or frequency, among others. Processor or computation-based systems can be used in some examples to route the signal.

The array of SPDs 326 can be tuned to detect properties of the signal 304 in any region(s) of a wavelength range, i.e. about 100 nm to about 10,000 nm. For example, the array of SPDs 326 are tuned to detect signals within a first wavelength range (100 nm-4,000 nm) and the detector device 302 is configured to detect signals at a second wavelength range (4,000 nm and beyond) that is distinct, but not necessarily exclusive of the first wavelength range. The signal 310 is routed to the detector device 302 while the signal 308 is routed to the array of SPDs 326. However, SPDs of the array of 326 can be tuned to other wavelength ranges, for example, to detect and analyze the signals over the 4,000 nm and beyond wavelength range. In this way, even if the detector devices 302 are incapable of analyzing at the second wavelength range due to inoperability or other issues, the array of SPDs 326 can be tuned to different wavelength ranges to cover across the second wavelength range. In the embodiments, the SPDs of the array of SPDs 326 can detect unknown and known components with varied wavelengths even with signal propagation over a fiber optic cable or other conduits that experience power loss and reduced signal integrity.

It should be understood that the stated wavelength ranges of FIG. 3 are merely examples of wavelength ranges. Thus, other alterations and modifications of the wavelength range can occur based on the desired results. Further, the number of SPDs of the array 326 can be increased or decreased depending on the desired results.

Figure 4:
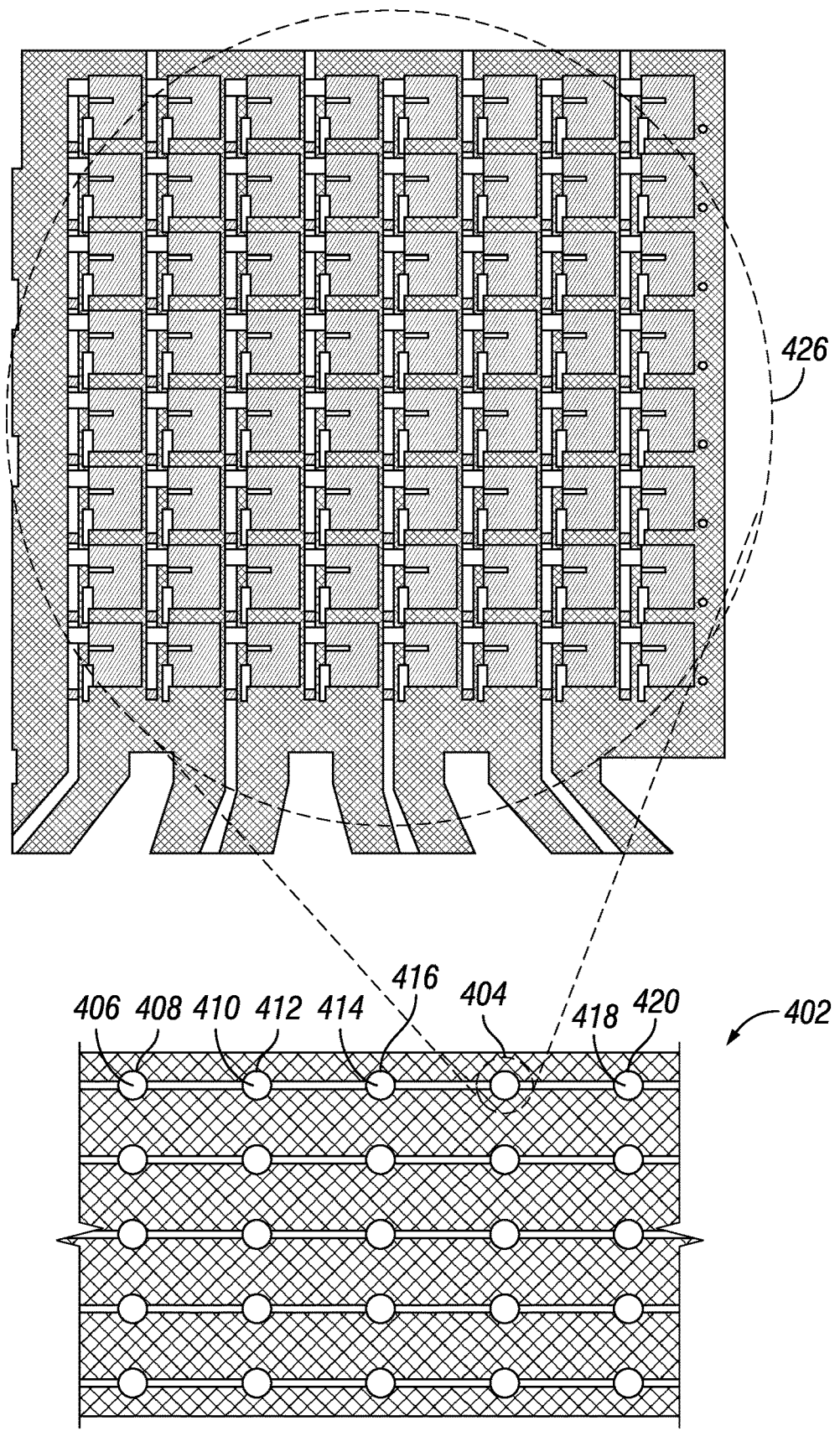
FIG. 4 is a perspective view of an example array of connector pads where an array of SPDs is connected to an individual connector pad, according to one or more embodiments.

FIG. 4 is a perspective view of an array of connector pads 402 where an array of SPDs 426 is connected to an individual connector pad 404, according to one or more embodiments. A transmission medium is connected to the connector pad 404 to transmit signals to the entire array of SPDs 426. The transmission medium can include a fiber optical cable or other conduit types that experience power loss and reduced signal integrity.

As described with respect to FIG. 2, the array of SPDs 426 on the connector pad 404 is tuned to analyze the spectrum of a sample. The array of SPDs 426 can be tuned to any wavelength or wavelength range, including from about 100 nm to about 10,000 nm. Likewise, each of the remaining connector pads of the array 402 can be connected to one or more SPDs that are tuned to detect and analyze other components of the sample.

For example, a first known component of a material includes water. Because water can be detected at various wavelengths, an array of SPDs 406 on a connector pad 408 is tuned to each of the various wavelengths associated with water. For example, one-third of the array of SPDs 406 on the connector pad 408 are tuned to 800 nm, another one-third of the array of SPDs 406 on the connector pad 408 are tuned to 2,000 nm, and the remaining array of SPDs 406 on the connector pad 408 are tuned to 3,500 nm.

A second known component of the material includes oil. Since oil can be detected at various wavelengths, an array of SPDs 410 on a connector pad 412 is tuned to detect and analyze wavelengths associated with the oil component. For example, one-third of the array of SPDs 410 on the connector pad 412 are tuned to 600 nm, another one-third of the array of SPDs 410 on the connector pad 412 are tuned to 2,200 nm, and the remaining array of SPDs 410 on the connector pad 412 are tuned to 4,000 nm.

When one or more components of a sample are unknown, an array of SPDs 414 on a connector pad 416 can be tuned to different wavelengths to broadly or to narrowly cover a wavelength range, as described with respect to FIG. 2. Specifically, the array of SPDs 414 on the connector pad 416 can be tuned to analyze signal(s) in any region(s) of a broad wavelength range, i.e. about 100 nm to about 10,000. Accordingly, the array of SPDs 414 is able to determine and provide property data for the varied chemical components in the sample regardless of the signal strength and the wavelength range.

A signal(s) that is analyzed by an array of SPDs 418 on a connector pad 420 can be characterized by the properties of the light, other than wavelength. For example, the array of SPDs 418 can be tuned based on power level, polarization, frequency, velocity, and the like.

It should be understood that the stated wavelength ranges of FIG. 4 are merely examples of wavelength ranges. Thus, other alterations and modifications of the wavelength range can occur based on the desired results. Further, the number of SPDs of the array 426 can be increased or decreased depending on the desired results.

In addition, to the embodiments described above, other examples of specific combinations are within the scope of the disclosure, some of which are detailed below:

Example 1

An optical detection system for analyzing a fluid sample, comprising: a light source configured to emit a light beam to interact with the sample to form a spectrum, an optical fiber to transmit the spectrum, an array of single-photon detectors (SPDs), and wherein each SPD is configured to receive and is tunable to analyze spectral characteristics of the spectrum across a spectral range.

Example 2

The system of Example 1, wherein the SPDs are tunable to different and/or similar wavelengths within the spectral range, the spectral range comprising a wavelength range of about 100 nanometers (nm) (0.1 micron ($\mu$m)) to about 10,000 nm (10 $\mu$m).

Example 3

The system of Example 2, wherein one or more SPDs are tunable to a wavelength range that covers about 500 nm (0.5 $\mu$m) of the total wavelength range.

Example 4

The system of Example 2, wherein one or more SPDs are tunable to a wavelength range that covers a range of about 0.001 nm to about 100 nm (0.1 $\mu$m) of the total wavelength range.

Example 5

The system of Example 1, further comprising an array of connector pads, each connector pad configured to receive one or more of the SPDs on a surface of the connector pad.

Example 6

The system of Example 1, wherein the array of SPDs is configured to analyze the spectrum based on a spectral characteristic comprising at least on

Example 7

The system of Example 1, further comprising a routing component configured to divide the spectrum into segments based on a spectral characteristic comprising at least one of a wavelength, a power level, a frequency level, and a polarization level.

Example 8

The system of Example 7, further comprising, a detector device, and wherein the divided segments of the spectrum are transmittable to either the array of SPDs or the detector device.

Example 9

The system of Example 1, wherein the array of SPDs are locatable above-ground or in a downhole environment.

Example 10

A method for analyzing a fluid sample, comprising, interacting a light with the sample to form a spectrum, transmitting the spectrum to an array of single-photon detectors (SPDs) using an optical fiber, and tuning each SPD of the array of SPDs to analyze spectral characteristics of the spectrum across a spectral range.

Example 11

The method of Example 10, further comprising tuning one or more of the SPDs to different and/or similar wavelengths within the spectral range, the spectral range comprising a wavelength range of about 100 nanometers (nm) (0.1 micron ($\mu$m)) to about 10,000 (nm) (10 micron ($\mu$m)).

Example 12

The method of Example 11, further comprising tuning one or more of the SPDs to a wavelength range that covers a range of about 0.001 nm to about 100 nm (0.1 $\mu$m) of the total wavelength range to analyze the spectrum across the spectral range.

Example 13

The method of Example 11, further comprising tuning one or more of the SPDs to a wavelength range that covers about 500 nm (0.5 $\mu$m) of the total wavelength range to analyze the spectrum across the spectral range.

Example 14

The method of Example 10, further comprising, dividing the spectrum into segments based on a spectral characteristic, and directing one or more of the segments to the array of SPDs or a detector device.

Example 15

The method of Example 14, further comprising routing the one or more segments of the spectrum based on one of a wavelength, a power level, or a polarization level.

Example 16

An optical detection system for analyzing a fluid sample, comprising, a light source configured to emit a light beam to interact with the sample to form a spectrum, an optical fiber to transmit the spectrum, an array of single-photon detector (SPDs) configured to receive and analyze spectral characteristics of a segment of the spectrum across a spectral range, and a detector device configured to receive and analyze spectral characteristics of another segment of the spectrum across a spectral range.

Example 17

The system of Example 16, further comprising a routing component configured to divide the spectrum into segments based on a spectral characteristic comprising at least one of a wavelength, a power level, a frequency level, and a polarization level.

Example 18

The system of Example 16, wherein the spectral range comprises a wavelength range of about 100 nanometers (nm) (0.1 micron (μm)) to about 10,000 nm (10 μm).

Example 19

The system of Example 16, wherein the SPDs of the array of SPDs and the detector device are configured to operate at different wavelengths to cover a wavelength range of about 100 nanometers (nm) (0.1 micron (μm)) to about 10,000 (nm) (10 micron (μm)).

Example 20

The system of Example 16, further comprising an array of connector pads, wherein each connector pad comprises one or more SPDs or at least one detector device.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. An optical detection system for analyzing a fluid sample taken within a wellbore, the optical detection system comprising:
 a sample chamber locatable within the wellbore, the sample chamber configured to contain the fluid sample;
 a light source configured to emit a light beam to interact with the fluid sample to form a spectrum;
 an optical fiber to transmit the spectrum uphole;
 an array of single-photon detectors (SPDs) locatable atop a surface; and
 wherein each SPD is configured to receive the spectrum via the optical fiber and is tunable to analyze spectral characteristics of the spectrum across a spectral range.

2. The system of claim 1, wherein the SPDs are tunable to different and/or similar wavelengths within the spectral range, the spectral range comprising a wavelength range of about 100 nanometers (nm) (0.1 micron (μm)) to about 10,000 nm (10 μm).

3. The system of claim 2, wherein one or more SPDs are tunable to a wavelength range that covers about 500 nm (0.5 μm) of the total wavelength range.

4. The system of claim 2, wherein one or more SPDs are tunable to a wavelength range that covers a range of about 0.001 nm to about 100 nm (0.1 μm) of the total wavelength range.

5. The system of claim 1, further comprising an array of connector pads, each connector pad configured to receive one or more of the SPDs on a surface of the connector pad.

6. The system of claim 1, wherein the array of SPDs is configured to analyze the spectrum based on a spectral characteristic comprising at least one of a wavelength, a power level, a frequency, and a polarization level.

7. The system of claim 1, further comprising a routing component configured to divide the spectrum into segments based on a spectral characteristic comprising at least one of a wavelength, a power level, a frequency, and a polarization level.

8. The system of claim 7, further comprising: a detector device; and
 wherein the divided segments of the spectrum are transmittable to either the array of SPDs or the detector device.

9. The system of claim 1, wherein the array of SPDs are locatable above-ground or in a downhole environment.

10. A method for analyzing a fluid sample taken within a wellbore, comprising:
 interacting a light with the sample within the wellbore to form a spectrum;

transmitting the spectrum uphole to an array of single-photon detectors (SPDs) located atop a surface using an optical fiber; and tuning each SPD of the array of SPDs to analyze spectral characteristics of the spectrum across a spectral range.

11. The method of claim 10, further comprising tuning one or more of the SPDs to different and/or similar wavelengths within the spectral range, the spectral range comprising a wavelength range of about 100 nanometers (nm) (0.1 micron (μm)) to about 10,000 (nm) (10 micron (μm)).

12. The method of claim 11, further comprising tuning one or more of the SPDs to a wavelength range that covers a range of about 0.001 nm to about 100 nm (0.1 μm) of the total wavelength range to analyze the spectrum across the spectral range.

13. The method of claim 11, further comprising tuning one or more of the SPDs to a wavelength range that covers about 500 nm (0.5 μm) of the total wavelength range to analyze the spectrum across the spectral range.

14. The method of claim 10, further comprising: dividing the spectrum into segments based on a spectral characteristic; and directing one or more of the segments to the array of SPDs or a detector device.

15. The method of claim 14, further comprising routing the one or more segments of the spectrum based on one of a wavelength, a power level, or a polarization level.

16. An optical detection system for analyzing a fluid sample taken within a wellbore, the optical detection system comprising:

a sample chamber locatable within the wellbore, the sample chamber configured to contain the fluid sample;

a light source configured to emit a light beam to interact with the fluid sample to form a spectrum;

an optical fiber to transmit the spectrum uphole;

an array of single-photon detector (SPDs) locatable atop a surface, the SPDs configured to receive and analyze spectral characteristics of a segment of the spectrum across a spectral range; and a detector device configured to receive and analyze spectral characteristics of another segment of the spectrum across a spectral range.

17. The system of claim 16, further comprising a routing component configured to divide the spectrum into segments based on a spectral characteristic comprising at least one of a wavelength, a power level, a frequency, and a polarization level.

18. The system of claim 16, wherein the spectral range comprises a wavelength range of about 100 nanometers (nm) (0.1 micron (μm)) to about 10,000 nm (10 μm).

19. The system of claim 16, wherein the SPDs of the array of SPDs and the detector device are configured to operate at different wavelengths to cover a wavelength range of about 100 nanometers (nm) (0.1 micron (μm)) to about 10,000 (nm) (10 micron (μm)).

20. The system of claim 16, further comprising an array of connector pads, wherein each connector pad comprises one or more SPDs or at least one detector device.

* * * * *

UNITED STATES PATENT AND TRADEMARK OFFICE
CERTIFICATE OF CORRECTION

PATENT NO. : 10,948,344 B2
APPLICATION NO. : 16/310479
DATED : March 16, 2021
INVENTOR(S) : Daniel J. Stark and John L. Maida Page 1 of 1

It is certified that error appears in the above-identified patent and that said Letters Patent is hereby corrected as shown below:

On the Title Page

Item (87) The PCT Publication date:
"January 3, 2018."
Should read:
"March 1, 2018."

Signed and Sealed this
Eleventh Day of May, 2021

Drew Hirshfeld
*Performing the Functions and Duties of the
Under Secretary of Commerce for Intellectual Property and
Director of the United States Patent and Trademark Office*